United States Patent [19]

Kappler et al.

[11] Patent Number: 5,098,972
[45] Date of Patent: Mar. 24, 1992

[54] HARDENABLE, FLUORINATED COPOLYMER, PROCESS FOR ITS MANUFACTURE AND ITS APPLICATION IN VARNISHES AND PAINTS

[75] Inventors: Patrick Kappler, Ecully; Jean-Luc Perillon, Bernay, both of France

[73] Assignee: Atochem, Puteaux, France

[21] Appl. No.: 724,845

[22] Filed: Jul. 2, 1991

Related U.S. Application Data

[62] Division of Ser. No. 511,568, Apr. 20, 1990.

[30] Foreign Application Priority Data

Apr. 28, 1989 [FR] France .................................. 89 05730

[51] Int. Cl.⁵ ........................ C08F 12/20; C08F 14/18

[52] U.S. Cl. ................................... 526/249; 526/253; 526/255

[58] Field of Search ...................... 526/249, 253, 255

[56] References Cited

U.S. PATENT DOCUMENTS

| | | | |
|---|---|---|---|
| 4,631,326 | 12/1986 | Koishi et al. | 526/249 |
| 4,788,266 | 11/1988 | Koishi et al. | 526/249 |
| 4,954,589 | 9/1990 | Sugawara et al. | 526/255 |

Primary Examiner—Joseph L. Schofer
Assistant Examiner—N. Sarofim
Attorney, Agent, or Firm—Sigalos & Levine

[57] ABSTRACT

A hardenable, fluorinated copolymer of fluorinated monomers and a hydroxylated and/or epoxidized allyl ether, paints and varnishes comprising such copolymers, and the process of making such copolymer.

4 Claims, No Drawings

HARDENABLE, FLUORINATED COPOLYMER, PROCESS FOR ITS MANUFACTURE AND ITS APPLICATION IN VARNISHES AND PAINTS

This application is a division of application Ser. No. 07/511,568, filed Apr. 20, 1990.

BACKGROUND OF THE INVENTION

The present invention pertains to a hardenable, fluorinated copolymer of vinylidene fluoride ($C_2H_2F_2$), at least one fluorinated monomer selected from tetrafluoroethylene ($C_2F_4$), chlorotrifluroethylene ($C_2F_3Cl$) and hexafluoropropylene ($C_3F_6$), and a hydroxylated and/or epoxidized allyl ether. This copolymer, which is soluble in organic solvents, is particularly recommended for the manufacture of paints and varnishes.

Fluorinated polymers are known for their good mechanical properties and their excellent resistance to chemical products and weather. Nevertheless, their insolubility in conventional solvents makes then unusable for certain application such as, for example, that as a resin for paints and varnishes where their properties are sought for the manufacture of coatings with good chemical and weather resistance and easy maintenance.

In order to profit from the desirable properties of the fluorinated polymers while avoiding their drawbacks, means were sought to make them soluble in conventional organic solvents. In order to achieve this, it is known to decrease the crystallinity of fluoride-containing polymers by copolymerization of monomers unsaturated in the ethylene position, of which monomers at least one is fluorinated.

In addition, to use such copolymers it is desirable for certain applications, particularly for their application in the manufacture of paints and varnishes, to preserve for them a sufficient degree of rigidity and to make them hardenable by incorporation of functional groups into their structure.

Such hardenable, fluorinated copolymers are described in French Patents 2,597,873 and 2,569,703. These products are obtained by copolymerization of chlorotrifluoroethylene, a fatty ester, and hydroxylated or ethoxylated allyl glycidyl ether. These copolymers can possibly contain less than 20% of another, non-fluoride-containing comonomer. If these copolymers contain more than 20% of the preceding comonomer, they lose their solubility in solvents and their transparency. In addition, the introduction of fluorine by the intermediate of $C_2F_3Cl$ alone also brings with it the chlorine-containing element which is not desirable in large amounts for the optical properties and resistance to corrosion.

In JP 59-174,657/84, there is also described a hardenable copolymer based on vinylidene fluoride, tetrafluoroethylene, chlorotrifluoroethylene, a vinyl ester and a hydroxylation agent. This copolymer, which contains less than 45% of vinyl ether fluoride and is based on vinyl ester, has the drawback of yielding after hydrolysis a rather strongly colored copolymer solution, which damages the transparency of the subsequently prepared varnishes.

SUMMARY OF THE INVENTION

The object of the present invention is a fluorinated copolymer, which is easily hardenable in the hot state in the possible presence of a hardening agent. When dissolved in an appropriate solvent, this copolymer may be used as a paint or varnish to form coatings which are hard, stable and transparent in the absence of pigments and which adhere well to metals, glass, wood, cement, plastics, and the like.

The hardenable copolymer in accordance with the invention, which contains the copolymerization radicals of a fluorinated monomer and a hydroxylated and/or epoxidized allyl ether, is characterized in that:

(i) the fluorinated monomer radicals originate from the association of vinylidene fluoride and another fluorinated monomer selected from among tetrafluoroethylene, chlorotrifluoroethylene, hexafluoropropylene and the mixture of at least two of these three monomers, and (ii) in that the allyl ether is selected from a compound of the formula:

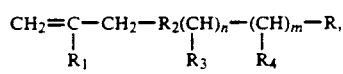

R being: $CH_2OH$ or

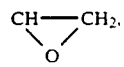

$R_1$ being: H or $CH_3$,
$R_2$ being:

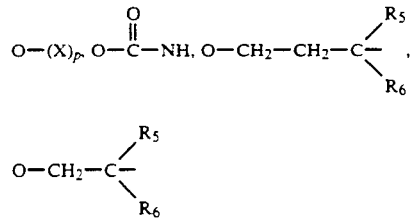

in which

P is a number from 0 to 3

X is $(CH_2)_q$-O in which q is a number from 1 to 3, and $R_5$ and $R_6$, which may be identical or different, are each H, $CH_2OH$, $CH_2$—$CH_2$—OH, or $CH_3$ $R_3$ and $R_4$, which may be identical or different, are each H or OH, and "n" and "m", which may be identical or different, being each numbers from 0 to 2.

DETAILED DESCRIPTION

With respect to copolymer, the association for 100 moles of the totality of fluorinated monomers is usually formed of:

(i) 50 to 98 moles of vinylidene fluoride, and
(ii) 2 to 50 moles of the other fluorinated monomer as defined.

Preferably, the hardenable, fluorinated copolymer in accordance with the invention is characterized in that it is comprised of monomer radicals originating from:

(i) 50 to 98 moles, preferably 70 to 85 moles, of vinylidene fluoride,
(ii) 2 to 50 moles, preferably 15 to 20 moles, of fluorinated monomer selected from tetrafluoroethylene, chlorotrifluoroethylene, hexafluoropropylene, or a mixture of at least two of the three monomers, and
(iii) 2 to 20 moles, preferably 5 to 10 moles, of the noted allyl ether per 100 moles of the totality of fluorinated monomers.

Compounds of the following formulas can be cited among the preferred allyl ethers:

$$CH_2=CH-CH_2-O-CH_2-CH_2-O-CH-CH_2-OH$$
$$\phantom{CH_2=CH-CH_2-O-CH_2-CH_2-O-CH}|$$
$$\phantom{CH_2=CH-CH_2-O-CH_2-CH_2-O-CH}OH$$

$$CH_2=CH-CH_2-O-CH_2-CH_2-OH$$

$$CH_2=CH-CH_2-O-CH_2-CH_2-CH_2-OH$$

$$CH_2=CH-CH_2-O-CH_2-CH_2-CH_2-CH_2-OH$$

$$CH_2=CH-CH_2-O-CH_2-CH_2-O-CH_2-CH_2-OH$$

$$CH_2=CH-CH_2-O-CH_2-CH_2-O-CH_2-CH_2-O-CH_2-CH_2-OH$$

$$CH_2=CH-CH_2-O-CH_2-CH-CH_2-OH$$
$$\phantom{CH_2=CH-CH_2-O-CH_2-CH}|$$
$$\phantom{CH_2=CH-CH_2-O-CH_2-CH}OH$$

$$CH_2=CH-CH_2-O-CH_2-CH\underset{O}{\overset{\diagup\diagdown}{-\!\!-\!\!-}}CH_2$$

$$CH_2=C-CH_2-O-CH_2-CH-CH_2-OH$$
$$\phantom{CH_2=}|\phantom{-CH_2-O-CH_2-CH}|$$
$$\phantom{CH_2=}CH_3\phantom{-CH_2-O-CH_2-}OH$$

$$CH_2=CH-CH_2-O-CH_2-CH_2-CH-CH_2-OH$$
$$\phantom{CH_2=CH-CH_2-O-CH_2-CH_2-CH}|$$
$$\phantom{CH_2=CH-CH_2-O-CH_2-CH_2-CH}CH_2$$
$$\phantom{CH_2=CH-CH_2-O-CH_2-CH_2-CH}|$$
$$\phantom{CH_2=CH-CH_2-O-CH_2-CH_2-CH}CH_2$$
$$\phantom{CH_2=CH-CH_2-O-CH_2-CH_2-CH}|$$
$$\phantom{CH_2=CH-CH_2-O-CH_2-CH_2-CH}OH$$

$$CH_2=CH-CH_2-O-C-NH-CH_2-OH$$
$$\phantom{CH_2=CH-CH_2-O-}||$$
$$\phantom{CH_2=CH-CH_2-O-}O$$

$$CH_2=CH-CH_2-O-CH_2-C\underset{CH_3}{\overset{CH_2OH}{\diagup\diagdown}}CH_2-OH$$

$$CH_2=CH-CH_2-O-CH_2-CH\underset{O}{\overset{\diagup\diagdown}{-\!\!-\!\!-}}CH_2$$

$$CH_2=CH-CH_2-O-(CH_2)_3-O-CH_2-CH\underset{O}{\overset{\diagup\diagdown}{-\!\!-\!\!-}}CH_2$$

$$CH_2=CH-CH_2-O-(CH_2)_3-CH\underset{O}{\overset{\diagup\diagdown}{-\!\!-\!\!-}}CH_2$$

In order to be able to use these copolymers in a liquid coating composition such as paint or varnish, it is recommended that the inherent viscosity of the copolymer dissolved in dimethyl formamide at 25° C. at a concentration of 1 g/dL be within the range of 0.03 to 0.4 dL/g.

The copolymer in accordance with the invention is principally obtained according to known solution polymerization procedures. A procedure consists of copolymerizing the monomers in a medium which is a solvent for all of the monomers, in the presence of an organosoluble initiator, at a temperature between 30° and 120° C., preferably between 40° and 80° C., under a pressure of approximately 10 to 80 bars, preferably between 15 and 40 bars.

In accordance with the invention, the hardenable copolymer is obtained by copolymerization of vinylidene fluoride, at least one fluorinated monomer selected from tetrafluoroethylene, chlorotrifluoroethylene or hexafluoropropylene, and the previously defined allyl ether. The following are employed for 100 moles of polymerized, fluorinated monomers;

(i) 50 to 98 moles of vinylidene fluoride, and (ii) 2 to 50 moles of tetrafluoroethylene or chlorotrifluoroethylene or hexafluoropropylene or a mixture of at least two of the three monomers, with which is associated the previously defined allyl ether.

In order to obtain a hardenable copolymer with the best properties, one usually associates 2 to 20 moles of the previously defined allyl ether per 100 moles of the totality of the fluorinated monomers.

In accordance with a preferred copolymerization mode, the solvent is heated to the selected reaction temperature in an agitated reactor which has first been degassed. A mixture of fluorinated monomers as well as an initial fraction of allyl ether are introduced into the reactor.

The amount of monomer mixture to be introduced to reach the selected reaction pressure depends on the solubility conditions of the fluorinated monomers in the selected solvent. The monomer to solvent weight ratio is generally between 0.1 and 1.

When the reaction pressure and the reaction temperature are reached, the polymerization initiator is introduced into the reaction. The formation of polymer is manifested by a drop in pressure which is compensated for by adding a fluorinated monomer mixture.

One can add a fluorinated monomer mixture of molar composition identical to that which was introduced initially. It is also possible to take into account the individual reactivities of each comonomer and adjust the composition of the mixture added during polymerization in order to create a copolymer of homogeneous composition.

The allyl compound can also be added during polymerization.

The allyl derivative is added in such a manner that the composition of the mixture of fluorinated monomers and allyl derivative introduced remains constant during the duration of the polymerization.

The addition of monomer mixture for maintaining the pressure is continued for a sufficiently long period of time to reach a dry extract on the order of 10 to 60%, preferably 15 to 40%.

The volatile residual monomers can be eliminated by degassing.

The final solution is extracted from the reactor and can be stored in that form. It can also be concentrated immediately or subsequently in order to obtain the amount of dry extract selected for the use of the copolymer.

The solvents selected for the copolymerization reaction must allow solubilization of the monomer mixture while remaining inert in relation to the other reaction components. They are selected preferably from among the acetates and alcohols. Among the preferred acetates, butyl, isobutyl and ethyl acetate are particularly recommended. When the copolymer is prepared for the purpose of application in formulations for paint or varnish, the butyl acetate or isobutyl acetate employed as solvent during the copolymerization can make it possible to obtain directly, without subsequent treatment, a composition which is usable as it is after, of course, addition of the complementary additives which are standard for these types of varnish and paint formulations.

The copolymerization initiators are known per se, the most popular being selected from among the radical polymerization initiators such as the perdicarbonates, perpivalates and azo compounds, such as diisopropyl or dicylcohexyl percarbonate, tertiobutyl or tertioamyl perpivalate, azobisisobutyronitrile and azo-bis-2,2-dimethylvaleronitrile.

Taking into account the effect of the solvent transfer agent and the cited initiators, the molecular weights of the polymers obtained are relatively low.

When the cross-linkable copolymer in accordance with the invention is to be used as the basis for a paint or varnish formulation, it can, as was already mentioned, be used as it is in its initial reaction solvent medium. It can also be more or less concentrated and put again into solution in a solvent which is better adapted to the type of paint or varnish desired. As is, the copolymer in solvent medium yields a colorless and transparent solution. To this solution can be added the desired additives such as pigments, fillers, diluents, ultraviolet absorption agent, catalysts, stabilizing agent or even hardening agent to improve the hardening reaction via hot cross-linking. Among the most well-known hardening agents can be cited melamine formaldehyde, the isocyanates, polyamides, organic acids or their anhydrides. The cross-linking temperature of these copolymers is generally between 0° to 260° C. and essentially depends on the chemical nature of the hardener and the conditions of implementation.

The invention will be further described in connection with the following examples which are set forth for purposes of illustration only.

EXAMPLE 1

Two liters of ethyl acetate are introduced into a 3.3-L autoclave equipped with effective agitation, which has been degassed under vacuum. The autoclave is brought to a temperature of 70° C. At this temperature, one adds 609 g of fluorinated monomer mixture containing vinylidene fluoride, tetrafluoroethylene and chlorotrifluoroethylene to reach 20 bars of pressure in the respective molar proportions of 79/15/6.

One then adds 20.6 g of 3-allyloxy 1-2 propane diol, and then 11 g of tertiobutyl perpivalate.

To maintain the pressure at 20 bars, one adds over four hours 435 g of fluorinated monomer mixture containing vinylidene fluoride, tetrafluoroethylene and chlorotrifluoroethylene in the respective molar proportions of 79/15/6.

One adds simultaneously and continuously over the same duration of polymerization 41.6 g of 3-allyloxy 1-2 propane diol.

After four hours of polymerization, the autoclave is degassed and one discharges a transparent copolymer solution which has a dry extract of 26.5%. The copolymer contains fluorinated structural units originating from the vinylidene fluoride, tetrafluoroethylene and chlorotrifluoroethylene in the respective molar proportions of 81/13/7, determined by NMR (nuclear magnetic resonance) of the fluorine 19. The molar level of 3-allyloxy 1-2 propane diol in the copolymer is 4.3 mol. % in relation to the totality of fluorinated structural units. The inherent viscosity of the copolymer is 0.122 dL/g.

EXAMPLE 2

Two liters of butyl acetate are introduced into a 3.3-L autoclave equipped with effective agitation, which has been degassed under vacuum. The autoclave is brought to a temperature of 70° C. At this temperature, one adds 491 g of fluorinated monomer mixture containing vinylidene fluoride, tetrafluoroethylene and chlorotrifluoroethylene to reach 20 bars of pressure in the respective molar proportions of 79/15/6.

One then adds 40.8 g of 3-allyloxy 1-2 propane diol, and then 20 g of tertiobutyl perpivalate.

To maintain the pressure at 20 bars, one adds over six hours 360 g of fluorinated monomer mixture containing vinylidene fluoride, tetrafluoroethylene and chlorotrifluoroethylene in the respective molar proportions of 79/15/6.

One adds simultaneously and continuously over the same duration of polymerization 41.6 g of 3-allyloxy 1-2 propane diol.

After six hours of polymerization, the autoclave is degassed and one discharges a transparent copolymer solution which has a dry extract of 19%. The copolymer contains fluorinated structural units originating from the vinylidene fluoride, tetrafluoroethylene and chlorotrifluoroethylene in the respective molar proportions of 82/12/7, determined by NMR of the fluorine 19. The molar level of 3-allyloxy 1-2 propane diol in the copolymer is 8.6 mol. % in relation to the totality of fluorinated structural units. The inherent viscosity of the copolymer is 0.067 dL/g.

EXAMPLE 3

Two liters of ethyl acetate are introduced into a 3.3-L autoclave equipped with effective agitation, which has been degassed under vacuum. The autoclave is brought to a temperature of 50° C. At this temperature, one adds 890 g of fluorinated monomer mixture containing vinylidene fluoride, tetrafluoroethylene and chlorotrifluoroethylene to reach 20 bars of pressure in the respective molar proportions of 79/15/6.

One then adds 40.8 g of 3-allyloxy 1-2 propane diol and then 10 g of cyclohexyl perdicarbonate.

To maintain the pressure at 20 bars, one adds over five hours 230 g of fluorinated monomer mixture containing vinylidene fluoride, tetrafluoroethylene and chlorotrifluoroethylene in the respective molar proportions of 79/15/6.

One adds simultaneously and continuously over the same duration of polymerization 21 g of 3-allyloxy 1-2 propane diol.

After five hours of polymerization, the autoclave is degassed and one discharges a transparent copolymer solution which has a dry extract of 20.8%. The copolymer contains fluorinated structural units originating from the vinylidene fluoride, tetrafluoroethylene and chlorotrifluoroethylene in the respective molar proportions of 82/12.5/6.5, determined, by NMR of the fluorine 19. The molar level of 3-allyloxy 1-2 propane diol in the copolymer is 4.5 mol. % in relation to the totality of fluorinated structural units. The inherent viscosity of copolymer is 0.207 dL/g.

EXAMPLE 4

Two liters of ethyl acetate are introduced into a 3.3-L autoclave equipped with effective agitation, which has been degassed under vacuum. The autoclave is brought to a temperature of 50° C. At this temperature, one adds 1,173 g of fluorinated monomer mixture containing vinylidene fluoride and chlorotrifluoroethylene to reach 20 bars of pressure in the respective molar proportions of 85/15.

One then adds 35.6 g of 3-allyloxy 1-2 propane diol, and then 15 g of cyclohexyl perdicarbonate.

To maintain the pressure of 20 bars, one adds over six hours 121 g of fluorinated monomer mixture containing vinylidene fluoride and chlorotrifluoroethylene in the respective molar proportions of 85/15.

One adds simultaneously and continuously over the same duration of polymerization 15.6 g of 3-allyloxy 1-2 propane diol.

After six hours of polymerization, the autoclave is degassed and one discharges a transparent copolymer solution which has a dry extract of 14%. The copolymer contains fluorinated structural units originating from the vinylidene fluoride and chlorotrifluoroethylene in the respective molar proportions of 70/30, determined by NMR of the fluorine 19. The molar level of 3-allyloxy 1-2 propane diol in the copolymer is 5.5 mol. % in relation to the totality of fluorinated structural units. The inherent viscosity of the copolymer is 0.161 dL/g.

EXAMPLE 5

Two liters of ethyl acetate are introduced into a 3.3-L autoclave equipped with effective agitation, which has been degassed under vacuum. The autoclave is brought to a temperature of 70° C. At this temperature, one adds 600 g of fluorinated monomer mixture containing vinylidene fluoride, tetrafluoroethylene and hexafluoropropylene to reach 20 bars of pressure in the respective molar proportions of 75/15/10.

One then adds 30.6 g of 3-allyloxy 1-2 propane diol, and then 11 g of tertiobutyl perpivalate.

To maintain the pressure of 20 bars, one adds over six hours 405 g of fluorinated monomer mixture containing vinylidene fluoride, tetrafluoroethylene and hexafluoropropylene in the respective molar proportions of 75/15/10.

One adds simultaneously and continuously over the same duration of polymerization 41.2 g of 3-allyloxy 1-2 propane diol.

After six hours of polymerization, the autoclave is degassed and one discharges a transparent copolymer solution which has a dry extract of 25%. The copolymer contains fluorinated structural units originating from the vinylidene fluoride, tetrafluoroethylene and hexafluoropropylene in the respective molar proportions of 78/16/6, determined by NMR of the fluorine 19. The molar level of 3-allyloxy 1-2 propane diol in the copolymer is 4.3 mol. % in relation to the totality of fluorinated structural units. The inherent viscosity of the copolymer is 0.181 dL/g.

EXAMPLE 6

Into a 3.3-L autoclave equipped with effective agitation, which has been degassed under vacuum, one introduces 2 liters of ethyl acetate. The autoclave is brought to a temperature of 70° C. At this temperature, one adds 610 g of fluorinated monomer mixture containing vinylidene fluoride, tetrafluoroethylene and chlorotrifluoroethylene to reach 20 bars of pressure in the respective molar proportions of 79/15/6.

One then adds 22 g of 3-allyloxyethanol and then 15 g of tertiobutyl perpivalate.

To maintain the pressure of 20 bars, one adds over six hours 430 g of fluorinated monomer mixture containing vinylidene fluoride, tetrafluoroethylene and chlorotrifluoroethylene in the respective molar proportions of 79/15/6.

One adds simultaneously and continuously over the same duration of polymerization 48 g of 3-allyloxyethanol.

After six hours of polymerization, the autoclave is degassed and one discharges a transparent copolymer solution which has a dry extract of 26%. The copolymer contains fluorinated structural units originating from the vinylidene fluoride, tetrafluoroethylene and chlorotrifluoroethylene in the respective molar proportions of 81/12/7, determined by NMR of the fluorine 19. The molar level of 3-allyloxyethanol in the copolymer is 6.1 mol. % in relation to the totality of fluorinated structural units. The inherent viscosity of the copolymer is 0.117 dL/g.

EXAMPLE 7

Into a 3.3-L autoclave equipped with effective agitation, which has been degassed under vacuum, one introduces 2 liters of ethyl acetate. The autoclave is brought to a temperature of 70° C. At this temperature, one adds 609 g of fluorinated monomer mixture containing vinylidene fluoride, tetrafluoroethylene and chlorotrifluoroethylene to reach 20 bars of pressure in the respective molar proportions of 79/15/6.

One then adds 19.1 g of allylglycidyl ether and then 15 g of tertiobutyl perpivalate.

To maintain the pressure at 20 bars, one adds over six hours 440 g of fluorinated monomer mixture containing vinylidene fluoride, tetrafluoroethylene and chlorotrifluoroethylene in the respective molar proportions of 79/15/6.

One adds simultaneously and continuously over the same duration of polymerization 39.4 g of allylglycidyl ether.

After six hours of polymerization, the autoclave is degassed and one discharges a transparent copolymer solution which has a dry extract of 25%. The copolymer contains fluorinated structural units originating from the vinylidene fluoride, tetrafluoroethylene and chlorotrifluoroethylene in the respective molar proportions of 81/13/6, determined by NMR of the fluorine 19. The molar level of allylglycidyl ether in the copolymer is 4.3 mol. % in relation to the totality of fluorinated structural units. The inherent viscosity of the copolymer is 0.122 dL/g.

EXAMPLE 8

The following varnish is prepared by simple mixing of the constituents:

|  | Parts by Weight |
|---|---|
| (i) fluorinated copolymer of Example 1 containing 4.3M of allyloxypropanediol and at 26.5% of dry extract in ethyl acetate | 100 |
| (ii) partially methylated melamine formaldehyde resin (viscosity 7,000 mPa.s at 90% dry extract in isobutanol) | 12.6 |

The varnish is applied in 100 μm strokes on a chromated aluminum support, then baked for 30 minutes at 130° C. to yield an 18 μm thick, dry film. The cross-linkage is evaluated by the methyl ethyl ketone (MEK) resistance test in which a cotton cloth impregnated with methyl ethyl ketone is rubbed with a back and forth movement over the film until the film is abraded. A number of back and forth strokes between 50 and 100 is an indication of good cross-linkage. A number equal to 100 or more is the indication of excellent cross-linkage. The compatability of the varnish is evaluated on the basis of transparency of the films obtained with:

| | |
|---|---|
| E = excellent | total transparency |
| G = good | slight clouding |
| P = poor | translucent film |

The film produced above resisted more than 100 back and forth strokes with MEK and displayed on excellent transparency.

EXAMPLE 9

The following varnishes are prepared by simple mixing of the constituents (in parts by weight):

| | | 2A | 2B | 2C | 2D |
|---|---|---|---|---|---|
| (i) | fluorinated copolymer of Example 2 (containing 8.6 mol. % of allyloxypropanediol and 19% of dry extract in butyl acetate) | 100 | 100 | 100 | 100 |
| (ii) | partially methylated melamine formaldehyde resin (viscosity 7,000 mPa.s at 90% dry extract in isobutanol) | 7.0 | 7.0 | — | — |
| (iii) | hexamethylene diisocyanate trimer (NCO content 22%) | — | — | 7.3 | 7.3 |
| (iv) | dibutyltin dilaurate | — | — | 0.05 | 0.05 |

These varnishes are applied in 150 μm strokes on a 0.7-mm thick chromated aluminum support.

Test 2A is baked at 130° C. for 30 minutes.

Test 2B is baked so as to obtain a minimum plate temperature (MPT) of 250° C. for 40 seconds.

Test 2C is allowed to dry at room temperature for 30 days.

Test 2D is baked at 80° C. for 30 minutes and then left at room temperature for 8 days. The films exhibit the following characteristics:

| | 2A | 2B | 2C | 2D |
|---|---|---|---|---|
| MEK performance | >100 | >100 | >100 | >100 |
| Compatibility | E | E | E | E |

EXAMPLE 10

The copolymer of Example 2 is concentrated until a dry extract of 50% is obtained.

A paint is prepared under the following conditions:

One mixes 60.5 g of copolymer solution with 28.3 g of titanium dioxide in a ball mill so as to obtain a grinding paste with a grinding fineness smaller than 10 μm.

One takes 178 g of this paste and deconcentrates it with 22.4 g of partially methylated melamine formaldehyde resin to yield a white paint which has a Ford cup number 4 viscosity of 80 seconds.

This white paint is applied on chromated aluminum with 100 μm spiral strokes and then baked for 30 minutes at 130° C. in order to obtain a 22 μm thick, dry film. The paint obtained resists more than 100 back and forth strokes with MEK, has a Gardner luster measured at 60° of 50%, a class 0 adherence determined according to NFT standard 30 038 and is not affected by a 1,000 hour exposure to the Q.U.V. The Q.U.V is an accelerated aging device in which the effects of sunlight are reproduced by means of four tubes emitting ultraviolet rays. The temperature during the ultraviolet exposure is 63° C. A water-condensation device makes it possible to maintain the humidity level at 100% relative humidity during the condensation phase. The temperature of the sample during the condensation phase is 50° C. The condensation and irradiation phases, each lasting four hours, are alternated.

EXAMPLE 11

A varnish is prepared by simply mixing of the constituents (in parts by weight):

| | | |
|---|---|---|
| (i) | fluorinated copolymer of Example 3 (4.5 mol. % of allyloxy propane diol at 20.8% in ethyl acetate) | 100 |
| (ii) | partially methylated melamine formaldehyde resin (viscosity 7,500 mPa.s at 90% in isobutanol) | 5.7 |

This varnish is applied in 150-μm strokes on a 0.8-mm galvanized steel support, then baked at 130° C. for 30 minutes to yield an 18μm thick, dry film.

This film resists more than 100 back and forth strokes with MEK and exhibits excellent transparency.

EXAMPLE 12

The copolymer solution of Example 3 is concentrated to a dry extract of 64%. One mixes 516 g of solution with 186 g of a blue cobalt pigment and 41 g of ethyl 3-ethoxypropionate in a ball mill so as to obtain a grinding paste with a grinding fineness smaller than 10 μm.

One takes 148.6 g of the resultant pigment paste and deconcentrates it with 18.4 g of partially methylated melamine formaldehyde resin and one adjusts the Ford cup number 4 viscosity to 80 seconds by diluting with 33 g of ethyl 3-ethoxypropionate.

This blue paint is applied on a 0.8-mm thick galvanized steel plate with 100μm strokes and then baked at 130° C. for 30 seconds to yield a 22 μm thick film.

This paint resists more than 100 back and forth strokes with MEK, has a Gardner luster measured at 60° of 40%, a class 0 adherence determined according to NFT standard 30 038 and is not affected by a 1,000 hour exposure to the Q.U.V.

EXAMPLE 13

A varnish is prepared by simple mixing of the following constituents (in parts by weight):

| | | 4A | 4B |
|---|---|---|---|
| (i) | fluorinated copolymer of Example 4 (5.5 mol. % in allyloxy propane diol and 14% of dry extract in ethyl acetate) | 100 | 100 |
| (ii) | partially methylated melamine | 3.9 | — |

|   |   | 4A | 4B |
|---|---|---|---|
|   | formaldehyde resin |   |   |
| (iii) | hexamethylene diisocyanate trimer | — | 3.4 |
| (iv) | dibutyltin dilaurate | — | 0.05 |

These varnishes are applied in 150 μm strokes on a 0.7 mm thick chromated aluminum plate.

Test 4A is baked at 130° C. for 30 minutes to yield a 16 μm thick, dry film.

Test 4B is baked at 80° C. for thirty minutes then left for 30 days at room temperature to yield a 16 μm thick film.

The films exhibit the following characteristics:

|   | 4A | 4B |
|---|---|---|
| MEK performance | >100 | 95 |
| Compatibility | E | E |

EXAMPLE 14

The preceding copolymer is concentrated to a 68.5% dry extract solution in ethyl acetate.

One mixes 424 g of copolymer solution with 272 g of titanium dioxide and 158 g of ethyl 3-ethoxypropionate in a ball mill so as to obtain a grinding paste with a grinding fineness smaller than 10 μm.

One takes 170.8 g of this paste and deconcentrates it with 21.6 g of melamine formaldehyde resin and 7.8 g of ethyl 3-ethoxypropionate to yield a white paint which has a Ford cup number 4 viscosity of 85 seconds.

This white paint is applied on a 0.7 mm thick chromated aluminum plate with 100 μm spiral strokes and then baked for 30 minutes at 130° C.

The paint obtained resists more than 100 back and forth strokes with MEK, has a Gardner luster measured at 60° C. of 55%, a class 0 adherence determined according to NFT standard 30 038 and is not affected by a 1,000 hour exposure to the Q.U.V.

EXAMPLE 15

A varnish is prepared by simple mixing of the following constituents (in parts by weight):

| (i) | fluorinated copolymer of Example 5 (4.3 mol. % of allyloxy propane diol and 25% of dry extract in ethyl acetate) | 100 |
|---|---|---|
| (ii) | hexamethoxymethylmelamine resin (HMMM) | 2.7 |

This varnish is applied in 125 μm strokes on a 0.8 mm thick galvanized steel support.

The plate is baked so as to obtain a minimum plate temperature (MPT) of 250° C. for 40 seconds and a 20 μm thick, dry film which resists more than 100 back and forth strokes with EK and has good compatibility with MM.

EXAMPLE 16

A varnish is prepared by simple mixing of the following constituents (in parts by weight):

|   |   | 6A | 6B |
|---|---|---|---|
| (i) | fluorinated copolymer of | 100 | 100 |
|   | Example 6 (6.1 mol % of allyloxy ethanol and 26% of dry extract in ethyl acetate) |   |   |
| (ii) | partially methylated melamine formaldehyde resin | 9.6 | — |
| (iii) | p-toluene sulfonic acid | 0.2 | — |
| (iv) | hexamethylene diisocyanate trimer | — | 3.9 |
| (v) | dibutyltin dilaurate | — | 0.05 |

These varnishes are applied in 150 μm strokes on a 0.7 mm thick chromated aluminum support.

Test 6A is baked at 150° C. for 30 minutes to yield a 24 μm thick film.

Test 6B is baked at 80° C. for thirty minutes then left for 30 days at room temperature to yield a 22 μm thick, dry film.

The films exhibit the following characteristics:

|   | 6A | 6B |
|---|---|---|
| MEK performance | >100 | >100 |
| Compatability | E | E |

EXAMPLE 17

The preceding copolymer is concentrated to 55% dry extract solution in ethyl acetate.

One mixes 200 g of this copolymer solution with 102.8 g of a white titanium dioxide pigment and 38.6 g of ethyl 3-ethoxypropionate in a ball mill so as to obtain a grinding paste with a grinding fineness smaller than 10 μm.

One takes 170.7 g of the resultant pigment base and deconcentrates it with 20.4 g of partially methylated melamine formaldehyde resin and 0.4 g of p-toluene sulfonic acid and one adjusts it to a Ford cup number 4 viscosity of 80 seconds by diluting with 40 g of ethyl 3-ethoxypropionate.

The white paint is applied on a 0.7 mm thick chromated aluminum plate with 100 μm strokes and then baked for 30 minutes at 150° C. to yield a 24 μm thick, dry film. The white paint obtained resists more than 100 back and forth strokes with MEK, has a Gardner luster measured at 60° of 45%, a class 0 adherence determined according to NFT standard 30 038 and is not affected by a 1,000 hour exposure to the Q.U.V.

EXAMPLE 18

A varnish is prepared by simple mixing of the following constituents (in parts by weight):

| (i) | fluorinated copolymer of Example 7 (4.3 mol. % of allylglycidyl ether and 25% of dry extract in ethyl acetate) | 200 |
|---|---|---|
| (ii) | 4,4' diaminodiphenyl methane | 1.4 |

The varnish is applied with a pneumatic gun onto a polypropylene plate that had first been given a chlorinated paraffin-based primer coat.

The plate was baked at 60° C. for 45 minutes to obtain 16 μm thick, dry film and then left at room temperature for eight days.

The film exhibits a class 0 adherence on the support as determined by NFT standard 30 038 and resists more than 100 back and forth strokes with MEK.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A process for manufacturing a hardenable copolymer based on fluorinated monomer and hydroxylated and/or epoxidized allyl ether, comprising copolymerizing in solution:

(a) vinylidene fluoride, (b) at least one of tetrafluoroethylene, chlorotrifluoroethylene, or hexafluoropropylene, and (c) an allyl ether of the formula:

$$CH_2=\underset{R_1}{\underset{|}{C}}-CH_2-R_2(CH)_n-\underset{R_3}{\underset{|}{(CH)}}_m-R.$$

wherein

R is $CH_2OH$ or

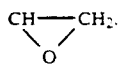

$R_1$ is H or $CH_3$, $R_2$ is

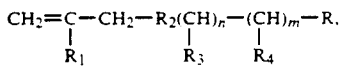

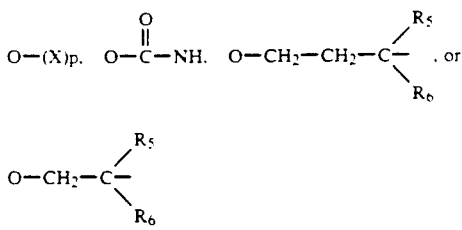

wherein p is a number from 0 to 3,

X is $(CH_2)_1-O$ with q a number from 1 to 3, $R_5$ and $R_6$, which can be identical or different, each being H, $CH_2OH$, $CH_2-CH_2-OH$, or $CH_3$, $R_3$ and $R_4$, which can be identical or different, each being H or OH, and n and m, which can be identical or different, and each being a number from 0 to 2.

2. The process of claim 1 wherein for 100 moles of fluorinated monomers;

(a) 50 to 98 moles represent vinylidene fluoride, and (b) 2 to 50 moles represent tetrafluoroethylene, chlorotrifluoroethylene, hexafluoropropylene or the mixture of at least two of these three monomers.

3. The process of claim 2, wherein for 100 moles of the totality of the fluorinated monomers, the following are used:

(a) 50 to 98 moles of vinylidene fluoride, (b) 2 to 50 moles of at least one of tetrafluoroethylene, chlorotrifluoroethylene, or hexafluoropropylene, and (c) 2 to 20 moles of an allyl ether.

4. The process of any one of claims 1 or 3, wherein the copolymerization is carried out at a temperature between about 30° and 120° C., in an organic solvent selected from an alcohol or acetate and at a pressure between about 10 to 80 bars.

* * * * *

UNITED STATES PATENT AND TRADEMARK OFFICE
CERTIFICATE OF CORRECTION

PATENT NO. : 5,098,972
DATED : March 24, 1992
INVENTOR(S) : KAPPLER, et al

It is certified that error appears in the above-identified patent and that said Letters Patent is hereby corrected as shown below:

Column 11, line 59, correct "EK" to read "MEK",
          line 60, correct "MM" to read "HMMM".
Column 14, line 14, correct "$(CH_2)_1$ to read "$(CH_2)_q$".

Signed and Sealed this

Third Day of August, 1993

Attest:

MICHAEL K. KIRK

*Attesting Officer*     *Acting Commissioner of Patents and Trademarks*